United States Patent
Molnar et al.

(10) Patent No.: US 6,687,387 B1
(45) Date of Patent: Feb. 3, 2004

(54) VELOCITY-DEPENDENT DEWARPING OF IMAGES

(75) Inventors: Joseph R. S. Molnar, Palo Alto, CA (US); Andrew H. Mutz, Palo Alto, CA (US)

(73) Assignee: Internet Pictures Corporation, Palo Alto, CA (US)

( * ) Notice: Subject to any disclaimer, the term of this patent is extended or adjusted under 35 U.S.C. 154(b) by 0 days.

(21) Appl. No.: 09/472,648

(22) Filed: Dec. 27, 1999

(51) Int. Cl.$^7$ .............................................. G06K 9/00
(52) U.S. Cl. ...................... 382/107; 382/276; 345/649; 345/427; 348/154
(58) Field of Search ............... 345/649, 427; 382/107, 276; 348/154

(56) References Cited

U.S. PATENT DOCUMENTS

| | | | |
|---|---|---|---|
| 4,763,280 A | 8/1988 | Robinson et al. | 364/518 |
| 4,811,245 A | 3/1989 | Bunker et al. | 364/521 |
| 4,841,292 A | 6/1989 | Zeno | 340/736 |
| 4,980,762 A | * 12/1990 | Heeger et al. | 348/700 |
| 5,185,667 A | 2/1993 | Zimmermann | 358/209 |
| 5,189,518 A | * 2/1993 | Nishida | 348/207.99 |
| 5,253,341 A | 10/1993 | Rozmanith et al. | 395/200 |
| 5,313,306 A | 5/1994 | Kuban et al. | 348/65 |
| 5,359,363 A | 10/1994 | Kuban et al. | 348/36 |
| 5,384,588 A | 1/1995 | Martin et al. | 348/15 |
| 5,388,990 A | 2/1995 | Beckman | 434/38 |
| 5,396,538 A | 3/1995 | Hong | 379/58 |
| 5,396,583 A | * 3/1995 | Chen et al. | 345/427 |
| 5,446,833 A | 8/1995 | Miller et al. | 395/125 |
| 5,581,638 A | 12/1996 | Givens et al. | 382/294 |
| 5,644,324 A | 7/1997 | Maguire, Jr. | 345/9 |
| 5,684,943 A | 11/1997 | Abraham et al. | 395/173 |
| 5,692,062 A | 11/1997 | Lareau et al. | 382/107 |
| 5,703,604 A | 12/1997 | McCutchen | 345/8 |
| 5,706,416 A | 1/1998 | Mann et al. | 395/127 |
| 5,734,421 A | 3/1998 | Maguire, Jr. | 348/121 |
| 5,748,194 A | 5/1998 | Chen | 345/427 |
| 5,764,276 A | 6/1998 | Martin et al. | 348/13 |
| 5,796,426 A | 8/1998 | Gullichsen et al. | 348/207 |
| 5,850,352 A | 12/1998 | Moezzi et al. | 364/514 |
| 5,903,319 A | 5/1999 | Busko et al. | 348/607 |
| 5,903,395 A | 5/1999 | Rallison et al. | 359/630 |

OTHER PUBLICATIONS

"Applications Of Virtual Reality And Medicine", Kristie Maguire, May 30, 1997, 8 pages, website download www.hitl.washington.edu.

"Communicating Situation Awareness in Virtual Environments Year 3 interim report", Human Interface Technology Laboratory, May 15, 1994 to Jul. 14, 1996, 20 pages, website download www.hitl.washington.edu.

(List continued on next page.)

*Primary Examiner*—Leo Boudreau
*Assistant Examiner*—Tom Ying Lu
(74) *Attorney, Agent, or Firm*—Frost Brown Todd LLC

(57) ABSTRACT

A method and apparatus are provided for dewarping images. According to one aspect of the present invention, rotational motion of a scene is taken into account for purposes for performing image dewarping. The image is extracted from the scene by selecting pixel values from an environment map that correspond to a viewing plane. Velocity information associated with rotational motion of the scene is determined. Then, based upon the velocity information, a velocity-dependent transformation is determined. Finally, a perspective image is created by applying the velocity-dependent transformation to the image. In this manner, when the images is presented to a user, the appearance of visible and objectionable distortion may be reduced while maintaining the perceived geometric accuracy of the image. For example, when the scene is rotating at a high angular velocity, little or no dewarping may be performed and the image extracted therefrom may be presented essentially uncorrected. In contrast, when the scene is not rotating, the image may be fully corrected. Between these extremes of high angular velocity and no angular velocity, the amount of dewarping may be modulated to intermediate values.

10 Claims, 8 Drawing Sheets

OTHER PUBLICATIONS

"Does a Ventilator Management Protocol Improve With Virtual Reality?", Antonio Ortiz, RCP, Jul. 31, 1998, 8 pages, downloaded from website www.nyu.edu.

"Human Factors in Virtual Environments for the Visual Analysis of Scientific Data", M.P. Baker & C.D. Wickens, 1992, 21 pages, website download www.doctest.ncsa.uiuc.edu.

Human Interface Technology Laboratory, "Perception and Human Factors Issues Related to the Design of the Virtual Vision Sport", J.E. Williamson, 17 pages, website download www.hitl.washington.edu.

High Technology Thesis, "A Note on the Legal Issues Surrounding Virtual Reality Technology", M.E. Thompson, 13 pages, website download www.suffolk.edu.

"Virtual Reality and Cybersickness", D. Crow, Jan. 26, 1996, 4 pages, website download www.cs.cmu.edu.

"Virtual Reality Applications to Work", School of Occupational Therapy, 18 pages, website download www.utoronto.ca.

* cited by examiner

VELOCITY-DEPENDENT DEWARPING OF IMAGES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of image processing and image navigation. More particularly, the invention relates to a novel process for varying the level of dewarping applied to images containing a predictable, analytical distortion.

2. Description of the Related Art

Immersive (or panoramic) images are a valuable tool for presentation of 360 degree scenes. Such images are widely used in 3D games, virtual tours, digital marketing, and other virtual reality applications, such as virtual environment navigation.

FIG. 1 is a high-level block diagram of a prior art image capture and viewing system. The image capture and viewing system includes an image viewer 110, a scene database 120, a scene capture process 130, a video camera 140, and a display 150. Immersive images are commonly generated by an image processing application, such as scene capture process 130. The scene capture process 130 typically combines (or stitches together) a number of images that have been recorded using an image recording device, such as video camera 140 having a wide field-of-view lens (e.g., a "fisheye" lens). One or more 360 degree scenes generated in this manner may then be stored by the scene capture process 130 in the scene database 120 for later retrieval and presentation by the image viewer 110.

In order to correct distortion introduced during image capture, most immersive image viewers perform a geometric transformation process on a representation of the scene. This process of transforming distorted images to accurate perspective images is referred to as "dewarping". Dewarping the image restores the scene to proper perspective based upon the orientation of the perspective view.

It is well documented that some users of current immersive viewing technologies experience a sense of discomfort and disorientation commonly referred to as "cybersickness." Cybersickness is widely thought to be at least partly attributable to the lack of correspondence between the visible motion of the image and the physical motion of the user. Therefore, one approach to ease the feelings of discomfort and disorientation is to reduce the amount of dewarping performed on the image, thereby reducing the dynamic distortion the user sees. However, such an approach has the disadvantage of visible geometric inaccuracies in the image. For example, lines in the image that should appear as straight lines may remain somewhat curved as a result of the residual distortion.

In view of the foregoing, it is desirable to provide a dynamic dewarping technique that allows panoramic images to be presented in a manner that reduces the perception of distortion without sacrificing the perceived geometric accuracy of the image.

BRIEF SUMMARY OF THE INVENTION

A method and apparatus are described for dewarping images. According to one aspect of the present invention, rotational motion of a scene is taken into account for purposes for performing image dewarping. The image is extracted from the scene by selecting pixel values from an environment map that correspond to a viewing plane. Velocity information associated with rotational motion of the scene is determined. Then, based upon the velocity information, a velocity-dependent transformation is determined. Finally, a perspective image is created by applying the velocity-dependent transformation to the image.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
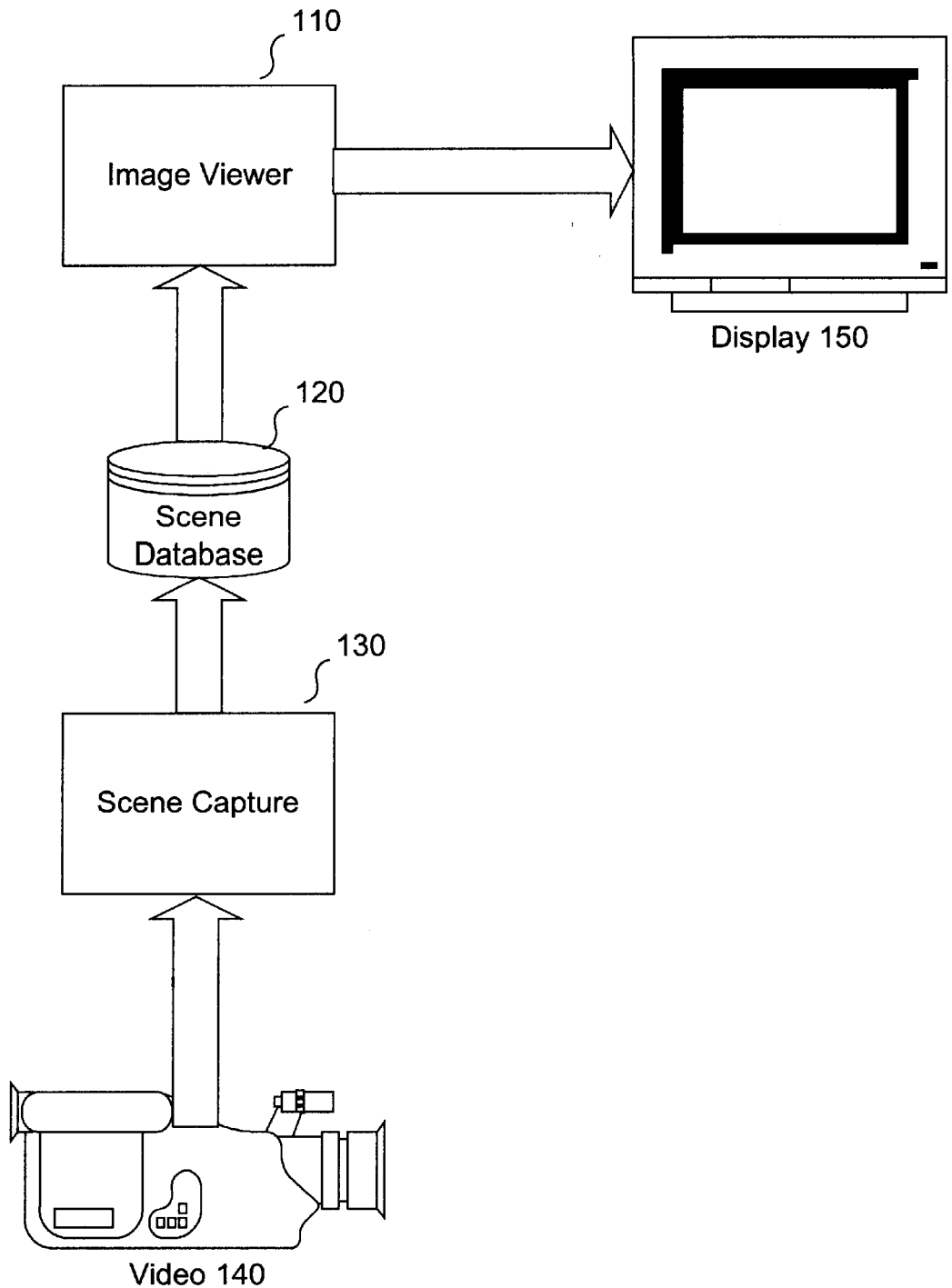
FIG. 1 is a high-level block diagram of a typical image capture and viewing system.

A method and apparatus are described for presenting images. Broadly stated, embodiments of the present invention seek to improve the user-experience associated with image viewers by dynamically adjusting the amount of dewarping performed on an image based upon characteristics of the scene being viewed. According to one embodiment, the geometric transformation matrix used to correct image distortions may be varied as a function of the angular velocity of the scene. For example, at a high angular velocity, little or no dewarping may be performed and the image may be presented essentially uncorrected. In contrast, when the scene is not rotating, the image may be fully corrected. Between these extremes of high angular velocity and no angular velocity, the amount of dewarping may be modulated to intermediate values thereby modifying the image in a continuous manner. Consequently, the appearance of visible and objectionable distortion is greatly reduced while maintaining the geometric accuracy of the image when the scene is not rotating. Advantageously, in this manner, it is thought that a significant portion of the discomfort and disorientation experienced by users can be eliminated.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

For convenience, embodiments of the present invention will be described with reference to a cylindrical geometrical model and a cylindrical environment map. However, various other geometrical models and environment maps may be employed. For example, a spherical environment map may be used for 360×360 images. Therefore, the present invention is not limited to any particular type of intermediate image format or environment map. In addition, while embodiments of the present invention are described with reference to a virtual tour of a home, the present invention is equally applicable to other types of programs and/or tools, such as 3D games and virtual environment navigation, that need to render environment maps representative of scenes potentially in motion. Moreover, while embodiments of the present invention are described in the context of correcting distortions introduced by wide-angle lenses, the techniques described herein produce noticeable improvements in image presentation even when the image is captured without the use of a wide-angle lens. Finally, the affects described herein with respect to 360 degree images are equally applicable and useful in connection with images that are less than 360 degrees and 360×360 images.

Terminology

Brief definitions of terms used throughout this application are given below.

The term "environment map" generally refers to a representation of a scene perceived from a particular viewpoint. Therefore, perspective views of arbitrary orientation and field-of-view can be generated by retrieving the appropriate pixel data from the environment map and presenting it on a display. Which is referred to as rendering the environment map.

A "view" generally refers to a portion of a scene which is visible to the user from a particular viewpoint. A view may conceptually be thought of as a window into the scene.

The terms "viewing plane" or "projective plane" generally refer to a display screen or a portion of a display screen on which a view is presented. Importantly, viewing plane may also include a memory such as a frame buffer or pixel buffer that stores pixel values prior to display. In any event, in order to be displayed, points in the environment map are projected onto the viewing plane (e.g., pixel values are read from the environment map and written into the viewing plane).

Image Capture and Viewing System Overview

FIG. 1 is a high-level block diagram of a typical image capture and viewing system that may benefit from the use of the present invention. The image capture and viewing system includes a video camera 140, a scene capture process 130, a scene database 120, an image viewer 110, and a display 150. Preferably, the video camera 140 is a high-resolution video camera which may be mounted to a round-about (not shown) and rotated to record video footage of the scene. A scene capture process 130 including a stitching process may be employed to create a seamless digital panoramic image for storage in the scene database 120. Preferably, the stitching process is automated as described in copending patent application Ser. No. 09/086,204, entitled "Method and Apparatus for Creating Seamless Digital Panoramic Images," which is assigned to the assignee of the present invention. Various other techniques may be employed to create digital panoramic images. For example, a conventional photographic camera may be used to take a sequence of photographs of a panoramic scene to be digitally images. Subsequently, graphics software may be used to manually align the digitized photographs (a process referred to as stitching) to form the digital panoramic image in the form of a 360 degree scene which may be stored in the scene database 120.

The image viewer 110 typically includes software for presenting perspective corrected images on the display device 150. The image viewer 110 typically allows a user to interactively define the perspective view by rotating and/or zooming the scene. However, as discussed above, the dewarping processing employed by current image viewers tends to cause feelings of discomfort and disorientation. In order to improve the user-experience associated with image viewers, the assignee of the present invention has developed a novel dewarping technique. As will be described further below, the amount of dewarping performed on an image may be dynamically adjusted based upon characteristics of the scene being viewed, such as the angular velocity of the scene.

Computer Architecture Overview

Figure 2:
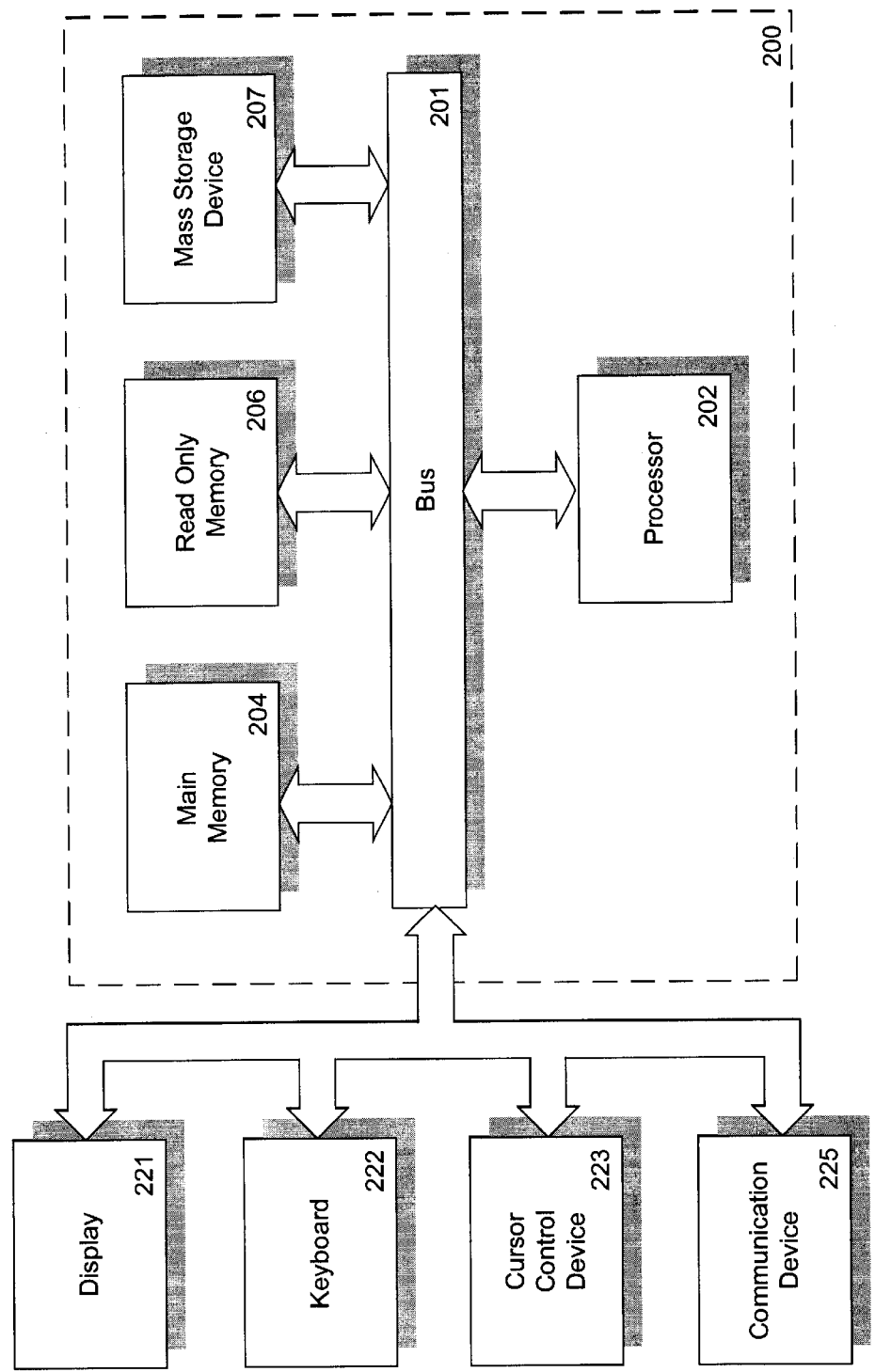
FIG. 2 is a block diagram of a computer system upon which one embodiment of the present invention may be implemented.

An exemplary machine in the form of a computer system 200 in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to an end user. For example, immersive images, graphics, and/or textual information may be presented to the end user on the display device 221. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201. The communication device 225 may include a modem, a network interface card, or other well known interface devices, such as those used for coupling to Ethernet, token ring, or other types of physical attachment for purposes of providing a communication link to support a local or wide area network, for example. In any event, in this manner, the computer system 200 may be coupled to a number of clients and/or servers via a conventional network infrastructure, such as a company's Intranet and/or the Internet, for example.

Environment Map Overview

The discussion herein presupposes the existence of an environment map or other intermediate representation of the scene. However, for purposes of providing context, it may be useful to briefly explain the relationship among the user's viewpoint, the viewing plane (projective plane), the surface upon which the scene has been captured, and the environment map. While ordinary rectilinear lenses can be thought of as imaging to a planar photosensitive surface, other types of lenses, such as fisheye lenses, are designed with a predictable, analytical distortion and should therefore be thought of as imaging to a 3D surface, e.g., a cylinder or a sphere.

Cylindrical Geometrical Model

Figure 3A:
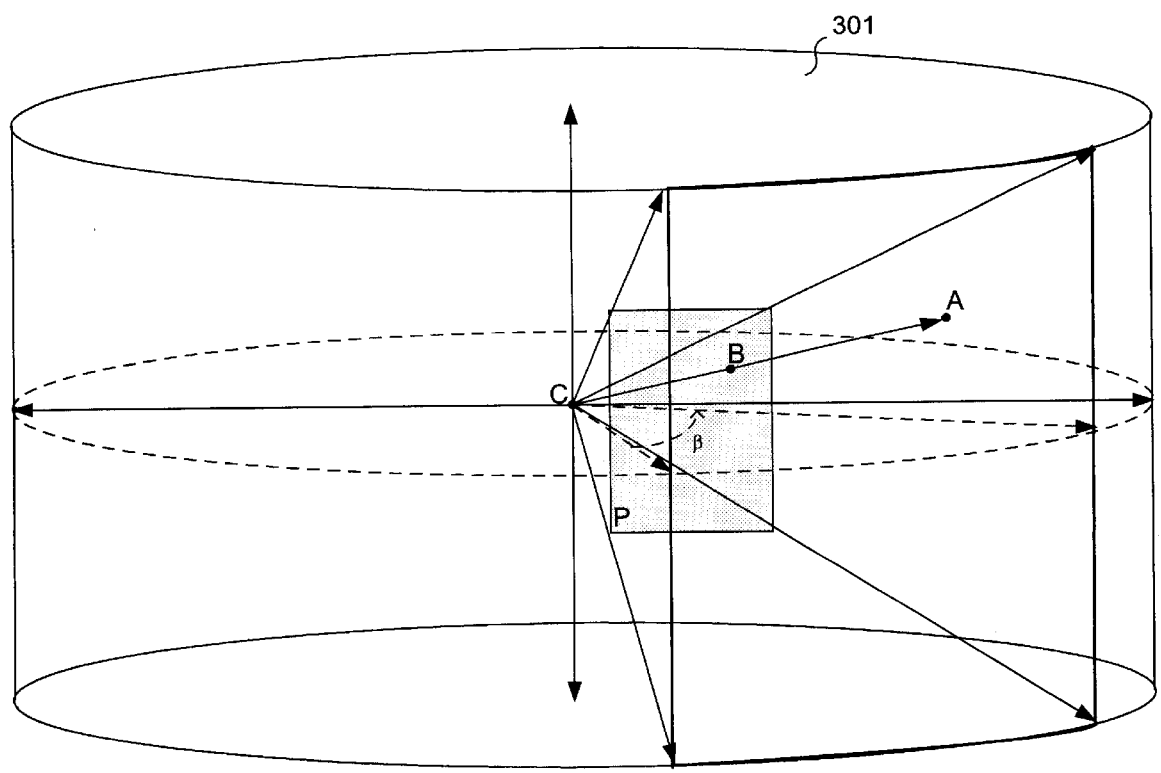
FIG. 3A conceptually illustrates the relationship between a viewing plane and a cylindrical geometrical model.

FIG. 3A conceptually illustrates the relationship between a viewing plane, P, and a cylindrical geometrical model. Cylinder 301 may represent a surface projection of a scene from which a cylindrical environment map may be generated. A perspective view of the scene may be generated by projecting vectors 321–324 from the center of the cylinder (the user's viewpoint, C,) through the viewing plane, P, onto the surface of the cylinder 301. The scene is subsequently flattened by sampling the surface of the cylinder that corresponds to the viewing plane, P, and writing the pixel values into the cylindrical environment map. Prior to rendering the cylindrical environment map on a display, distortion is typically removed to create an accurate perspective view. The perspective correction depends upon the orientation of the perspective view. Therefore, the correction must be performed in real-time as the user is interactively rotating and/or zooming the scene.

Spherical Geometrical Model

Figure 3B:
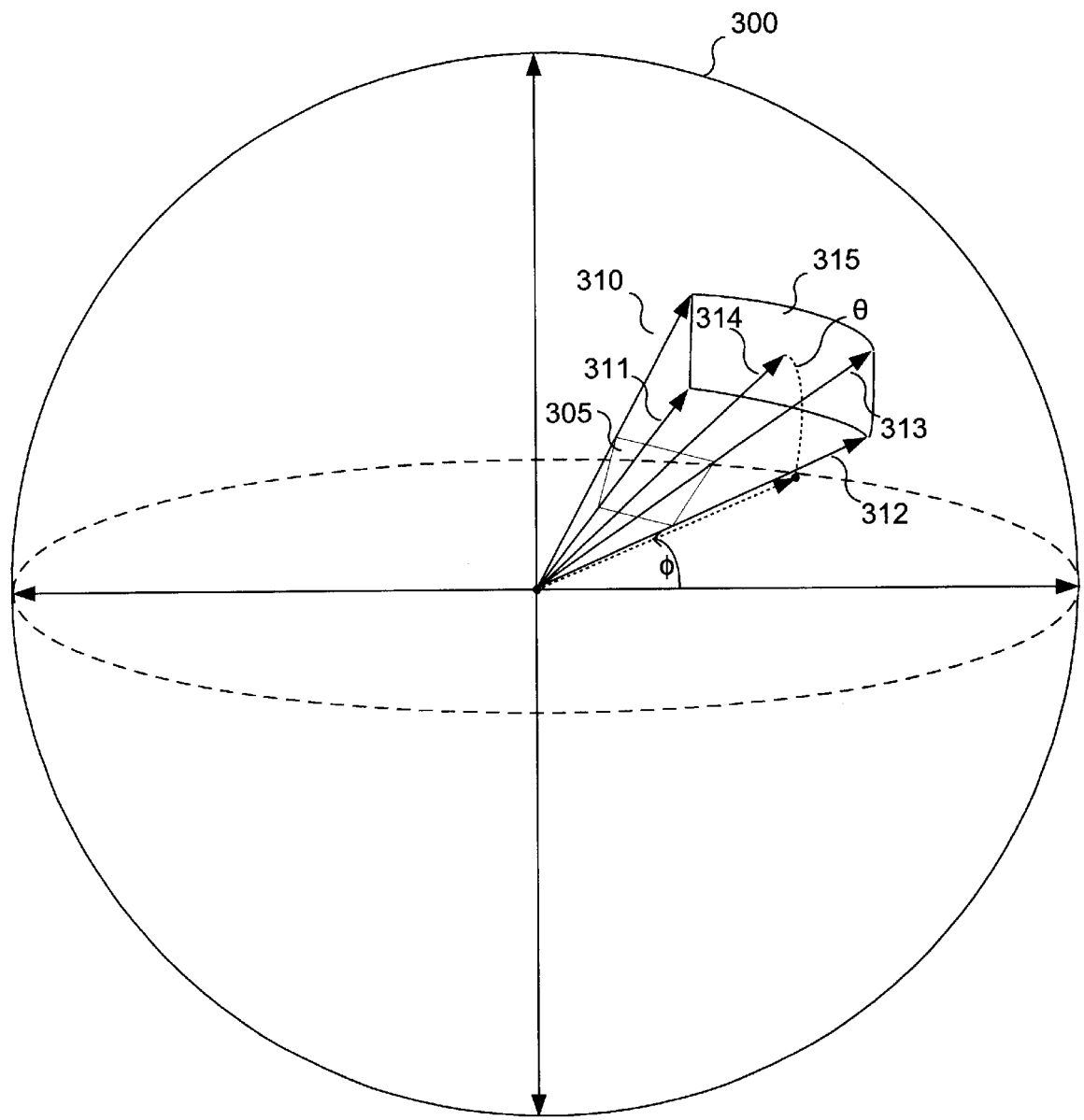
FIG. 3B conceptually illustrates the relationship between a viewing plane and a spherical geometrical model.

FIG. 3B conceptually illustrates the relationship between a viewing plane 305 and a spherical geometrical model. Sphere 300 may represent a surface projection of a scene from which a spherical environment map may be generated. A perspective view of the scene may be generated by projecting vectors 310–314 from the center of the sphere 300 (the user's viewpoint) through a viewing plane 305 onto the surface of the sphere 300. As above, the scene is subsequently flattened by sampling the surface 315 of the sphere that corresponds to the viewing plane 305 and writing the pixel values into the spherical environment map. Prior to rendering the spherical environment map on a display, distortion is typically removed to create an accurate perspective view. The perspective correction depends upon the orientation of the perspective view. Therefore, again, the correction must be performed in real-time as the user is interactively rotating and/or zooming the scene.

For further information and background on the use and generation of environment maps see U.S. Pat. No. 5,446,833 of Miller et al., U.S. Pat. No. 5,748,194 of Chen, and Greene, Ned, "Environment Mapping and Other Applications of World Projections," IEEE Computer Graphics and Applications, vol. 6, No. 11, November 1986, pp. 21–29.

Mathematical Expressions for the Cylindrical Geometrical Model

In general, the equation for transforming a point, A, on the surface of the cylinder 301 to a point, B, in the viewing plane, P, is $$A(\alpha, y) \rightarrow B(X, Y) \qquad \text{EQ \#1}$$

Where ($\alpha$, y) are cylindrical coordinates and (X,Y) are Dekart's coordinates of a plane. For the same spatial position of axis $\alpha=0$ and $X=0$ we will have:

$$X = R^* \cos(\beta)^* \tan(\alpha); \qquad \text{EQ \#2}$$

$$Y = y^* \cos(\beta)/\cos(\alpha); \qquad \text{EQ \#3}$$

Where R is the radius of the cylinder 301 which can be calculated as:

$$R = \frac{l}{2 * \sin(\beta/2)} \qquad \text{EQ \#4}$$

Where $\beta$ is field of view and l is desired length of a basic view rectangle that is accorded to this field of view.

However, in practice, the following inverse transform is commonly used:

$$B(X, Y) \rightarrow A(\alpha, y) \qquad \text{EQ \#5}$$

Where:

$$\alpha = \arctan\left(\frac{X}{R * \cos(\beta)}\right); \qquad \text{EQ \#6}$$

$$y = Y^* \cos(\alpha)/\cos(\beta); \qquad \text{EQ \#7}$$

Assuming a first-order polynomial warping, then an exemplary velocity-dependent transformation may be expressed in vector form as follows:

$$a = Mb^T \qquad \text{EQ \#8}$$

Where:

$$a = (\alpha, y) = (\alpha 0, y0, \alpha 1, y1, \alpha 2, y2, \alpha 3, y3, \ldots); \qquad \text{EQ \#9}$$

$$b = (X, Y) = (X0, Y0, X1, Y1, X2, Y2, X3, Y3, \ldots); \qquad \text{EQ \#10}$$

$$M = \begin{bmatrix} Mx_{0,0} & 0 & Mx_{0,1} & 0 & \cdots & 0 & 0 & 0 & 0 \\ 0 & My_{0,0} & 0 & My_{0,1} & \cdots & 0 & 0 & 0 & 0 \\ \cdots & \cdots & \cdots & \cdots & \cdots & \cdots & \cdots & \cdots & \cdots \\ 0 & 0 & 0 & 0 & \cdots & Mx_{n-1,0} & 0 & Mx_{n,1} & 0 \\ 0 & 0 & 0 & 0 & \cdots & 0 & My_{n-1,0} & 0 & My_{n,1} \end{bmatrix} \quad \text{EQ \#11}$$

Where:

$$Mx_{i,0} = \left] \arctan\left(\frac{Xi}{R * \cos(\beta)}\right) \right[ * \lambda; \quad \text{EQ \#12}$$

$$Mx_{i,1} = (Mx_{i,0} + 1) * (1 - \lambda); \quad \text{EQ \#13}$$

$$My_{i,0} = ]\cos(\alpha)/\cos(\beta)[ * \mu; \quad \text{EQ \#14}$$

$$My_{i,1} = (My_{i,0} + 1) * (1 - \mu); \quad \text{EQ \#15}$$

$$\lambda = \lambda(\omega); \quad \text{EQ \#16}$$

$$\mu = \mu(\omega); \quad \text{EQ \#17}$$

Where ω is azimuth velocity and $$\lambda(\omega) = \begin{cases} 1 - Mxi, 0 + ]Mxi, 0[; \ \omega \leq \omega 0 \\ 1; \ \omega > \omega 0 \end{cases} \quad \text{EQ \#18}$$

$$\mu(\omega) = \begin{cases} 1 - Myi, 0 + ]Myi, 0[; \ \omega \leq \omega 0 \\ 1; \ \omega > \omega 0 \end{cases} \quad \text{EQ \#19}$$

Where ω0 is some threshold velocity level that may be dependent upon CPU productivity, for example and ] . . . [ is the integer part of a floating-point value.

The requirement of the same spatial position of axis α=0 and X=0 is not a restriction because it can be shown that it bears only linear offsets. In practice, Dekart's coordinate x may be used in place of the angular coordinate α because of the following relationship between α and x:

$$\alpha = 4\pi \frac{x}{l} \quad \text{EQ \#20}$$

According to one embodiment, the floating-point operations of (X,Y)→(x,y) may be arranged as four look-up tables, LUT1, LUT2, LUT3, and LUT4. The x and y coordinates of cylinder 301 may be represented as:

$$x = \epsilon 1 \epsilon 2 \ldots \epsilon n.\phi 1 \phi 2 \ldots \phi m \quad \text{EQ \#21}$$

$$y = \eta 1 \eta 2 \ldots \eta n.\lambda 1 \lambda 2 \ldots \lambda m \quad \text{EQ \#22}$$

Where $\epsilon 1 \epsilon 2 \ldots \epsilon n$ represent the integer part of x, $\eta 1 \eta 2 \ldots \eta n$ represent integer part of y, $\phi 1 \phi 2 \ldots \phi m$ and $\lambda 1 \lambda 2 \ldots \lambda m$ are the fractional parts of x and y, respectively.

In one embodiment, a two-byte representation is used for the integer portions of x and y and a one-byte representation is used for the fractional parts of x and y. In this example, the integer bits may be referred to as $\epsilon 1 \epsilon 2 \ldots \epsilon 16$ and $\eta 1 \eta 2 \ldots \eta 16$ and the fractional bits may be referred to as $\phi 1 \phi 2 \ldots \phi 8$ and $\lambda 1 \lambda 2 \ldots \lambda 8$. Therefore, the fast execution of floating-point transformations based upon four look-up tables may be expressed as:

$$\epsilon 1 \epsilon 2 \ldots \epsilon 16 = \text{LUT1}(X, Y) \quad \text{EQ \#23}$$

$$\eta 1 \eta 2 \ldots \eta n 16 = \text{LUT2}(X, Y) \quad \text{EQ \#24}$$

$$\phi 1 \phi 2 \ldots \phi 8 = \text{LUT3}(X, Y) \quad \text{EQ \#25}$$

$$\lambda 1 \lambda 2 \ldots \lambda 8 = \text{LUT4}(X, Y) \quad \text{EQ \#26}$$

A first level linear approximation model may be used for calculation of RGB values associated with non-integer cylindrical coordinates.

Additionally, during high-speed rotations, only LUT1 and LUT2 may be used thereby saving not only two look-up operations, but also providing much faster zero-level approximation of RGB values.

Exemplary Application

Figure 4:
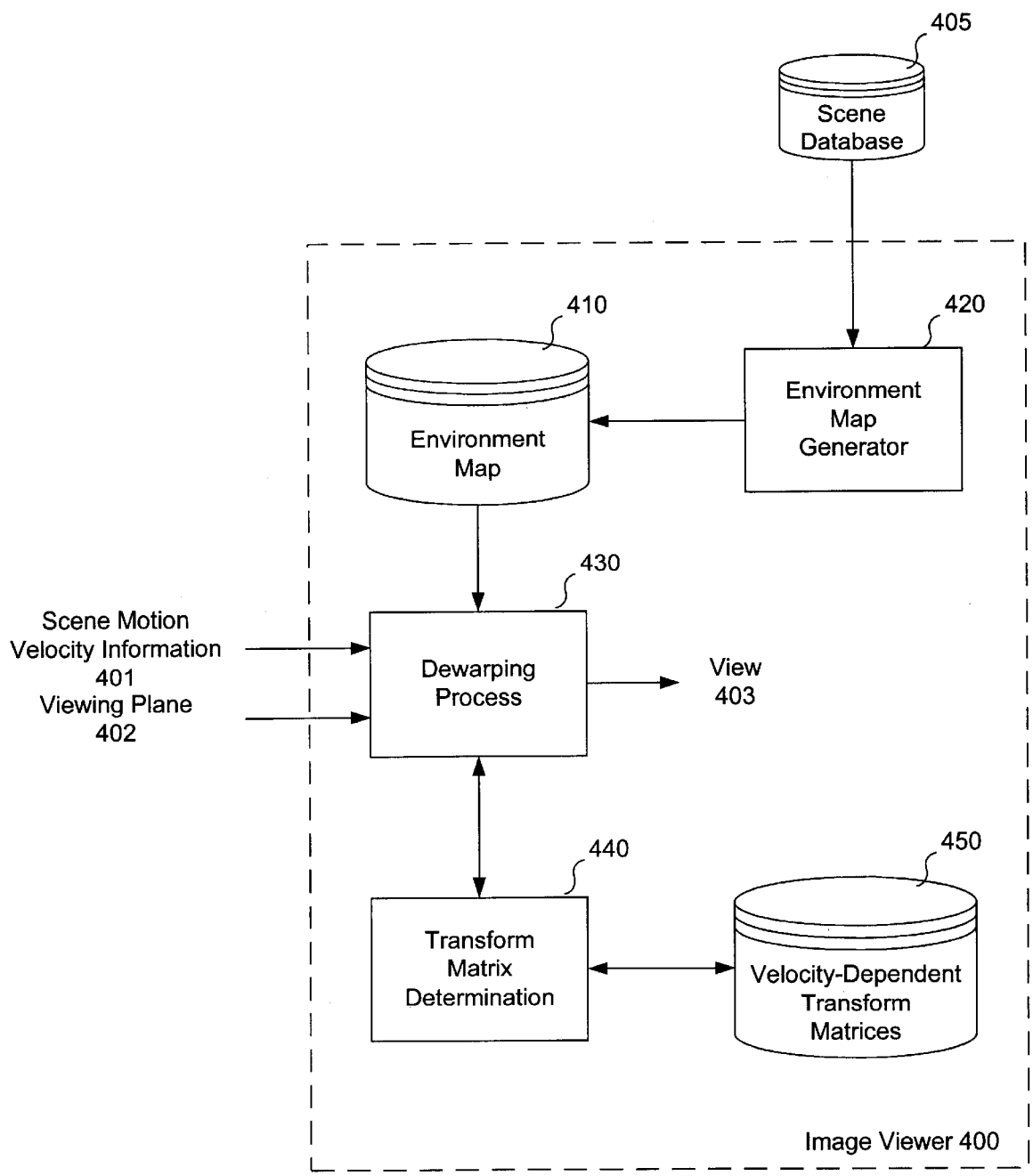
FIG. 4 is a simplified block diagram illustrating an image viewer according to one embodiment of the present invention.

FIG. 4 is a simplified block diagram illustrating an image viewer 400 according to one embodiment of the present invention. In this example, the image viewer 400 includes an environment map generator 420, an environment map 410, a dewarping process 430, a transform matrix determination process 440, and an optional set of predetermined velocity-dependent transform matrices 450.

The environment map generator 420 receives the previously captured scene and produces an environment map representation for use by the dewarping process. For a 360 degree scene, the preferred representation of the environment map 410 is as a cylinder. While for a 360×360 degree scene, the preferred representation is as a sphere. However, various other environment map representations may be used.

The dewarping process 430 produces a view 403 based upon scene motion velocity information 410 and information regarding the viewing plane 402. The dewarping process 430 extracts a portion of the environment map 410 corresponding to the viewing plane 402 and applies an appropriate geometric transform to correct image distortions. According to one embodiment, the scene motion velocity information 410 represents angular velocity attributable to a horizontal pan of the scene controlled by a user. The scene motion velocity information 410 may be communicated to the dewarping process 430 in any of a number of forms. For example, the scene motion velocity information 410 may represent the absolute angular velocity of the scene, a relative angular velocity (e.g., a difference between the current scene velocity and the an earlier reported value), or simply an indication of a change in scene velocity (e.g., an increase or decrease in scene velocity).

In this example, the velocity-dependent transform matrices 450 comprise a predetermined set of matrices for various predetermined velocity ranges. Consequently, the transform matrix determination process 440 need only select a velocity-dependent transform matrix that is most appropriate for the current scene motion velocity information. In alternative embodiments, velocity-dependent transforms may be calculated on-the-fly by the transform matrix determination process.

Importantly, the image viewer 400 of the present example is provided only as a means of describing an exemplary software architecture and allocation of image processing functionality among a group of functional units. It is contemplated that the processing described herein may be may be consolidated and/or distributed differently than as described. Therefore, it should be understood that embodiments of the present invention may assume many different forms without departing from the spirit and scope of the underlying concepts.

Dewarping Processing

Figure 5:
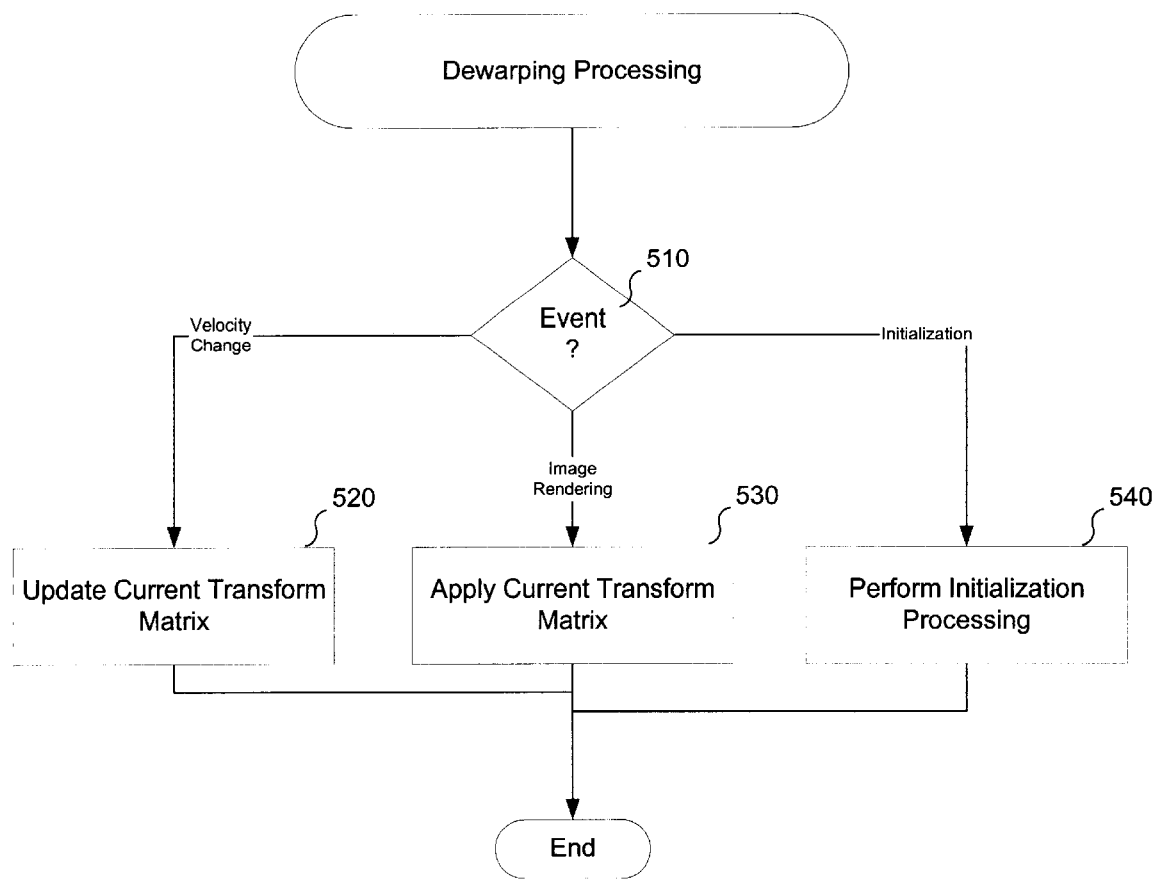
FIG. 5 is a flow diagram illustrating dewarping processing according to one embodiment of the present invention.

FIG. 5 is a flow diagram illustrating dewarping processing according to one embodiment of the present invention. Briefly, according to this example, the dewarping process 430 is event-driven. Various system events, such as initialization, scene velocity changes, and image rendering, trigger appropriate processing by the dewarping process 430. In one embodiment, the steps described below may be performed under the control of a programmed processor, such as processor 202. However, in alternative embodiments, the steps may be fully or partially implemented by any programmable or hardcoded logic, such as Field Programmable Gate Arrays (FPGAs), TTL logic, or Application Specific Integrated Circuits (ASICs), for example.

At step 510, an event is received by the dewarping process 430 and determination is made regarding the type of event. While only three types of events are described in this example, more or less events may be employed in alternative embodiments. At any rate, if the event represents image viewer 400 initialization, then processing continues with step 540. If the event is associated with image rendering, then processing proceeds with step 530. Otherwise, if the event is a velocity change, then processing continues with step 520.

At step 540, initialization processing is performed. For example, based upon the image size and field-of-view an initial dewarping transformation may be determined. Additionally, a set of velocity-dependent dewarping transformations, e.g., statically calculated matrices, may be generated for each of a predetermined set of velocity ranges. Finally, one of the velocity-dependent dewarping transformations may be established as the current dewarping transformation.

At step 520, in response to a change in scene velocity, the current dewarping transformation may be updated. In embodiments in which a set of velocity-dependent dewarping transformations have been calculated in advance (e.g., statically calculated matrices), the update may simply involve selecting the most appropriate velocity-dependent dewarping transformation based upon the current scene velocity. However, in embodiments in which the velocity-dependent dewarping transformations are dynamically calculated, the update involves generating a new velocity-dependent dewarping transformation based upon the current scene velocity. This dynamic calculation may involve the use of a table or analytic function to determine the amount of dewarping as a function of scene velocity.

At step 530, the current transform is applied to the environment map to create a velocity-dependent, perspective corrected image.

Figure 6:
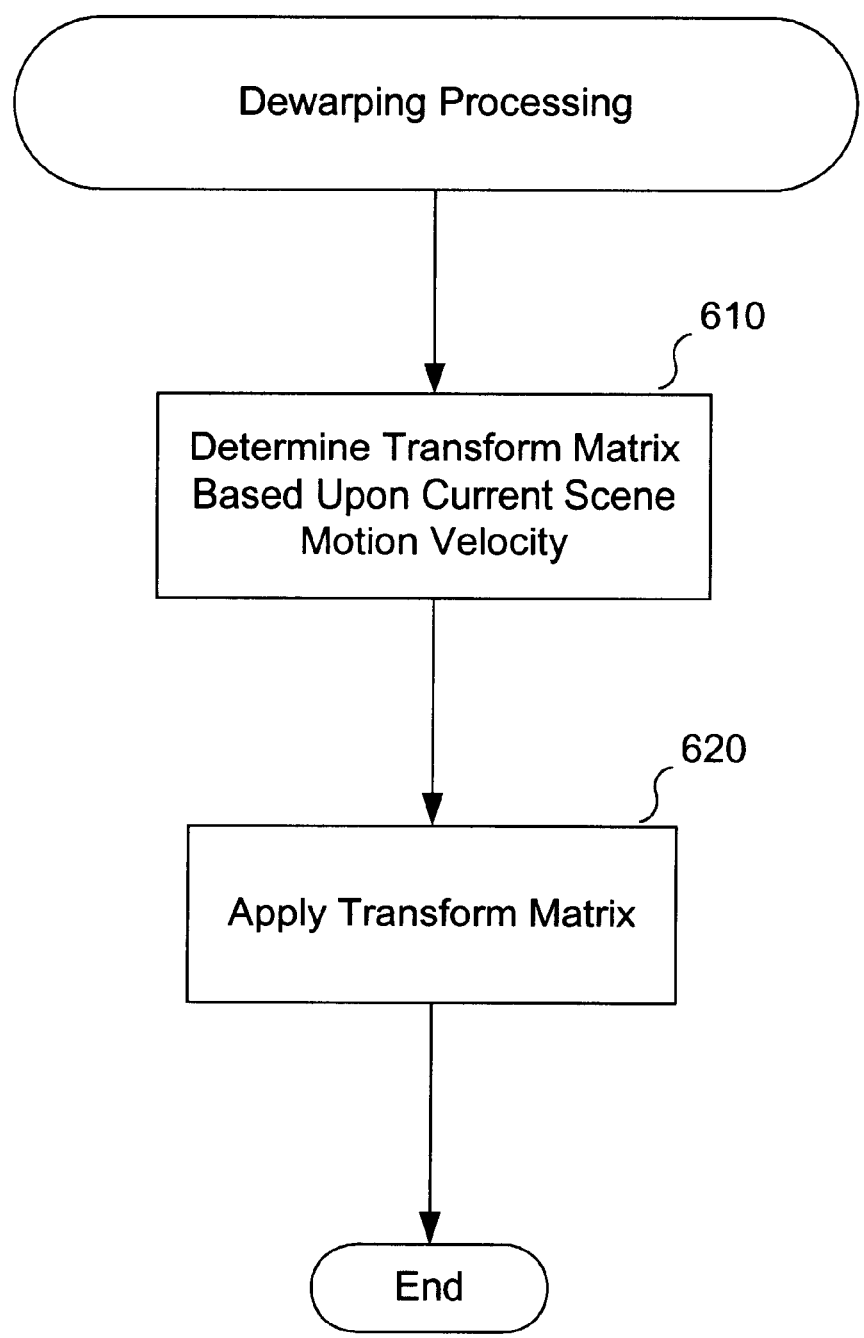
FIG. 6 is a flow diagram illustrating dewarping processing according to another embodiment of the present invention.

FIG. 6 is a flow diagram illustrating dewarping processing according to another embodiment of the present invention. In this example, rather than periodically updating a current transformation, the appropriate dewarping transformation is calculated on-the-fly, e.g., in real-time, just prior to its application to the environment map. At step 610, a velocity-dependent transformation is calculated based upon current scene motion velocity. At step 620, the velocity-dependent transformation calculated in step 610 is applied to the environment map to achieve the desired level of perspective correction.

Exemplary Images

Figure 7A:
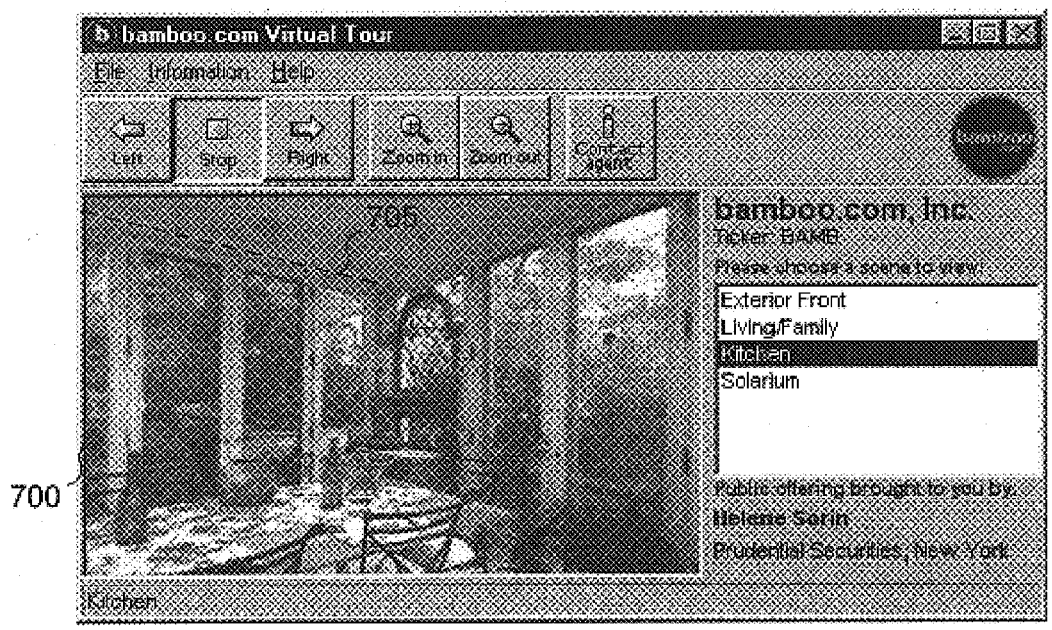
FIG. 7A illustrates an image with accurate dewarping as seen at a relatively low velocity according to one embodiment of the present invention.
Figure 7B:
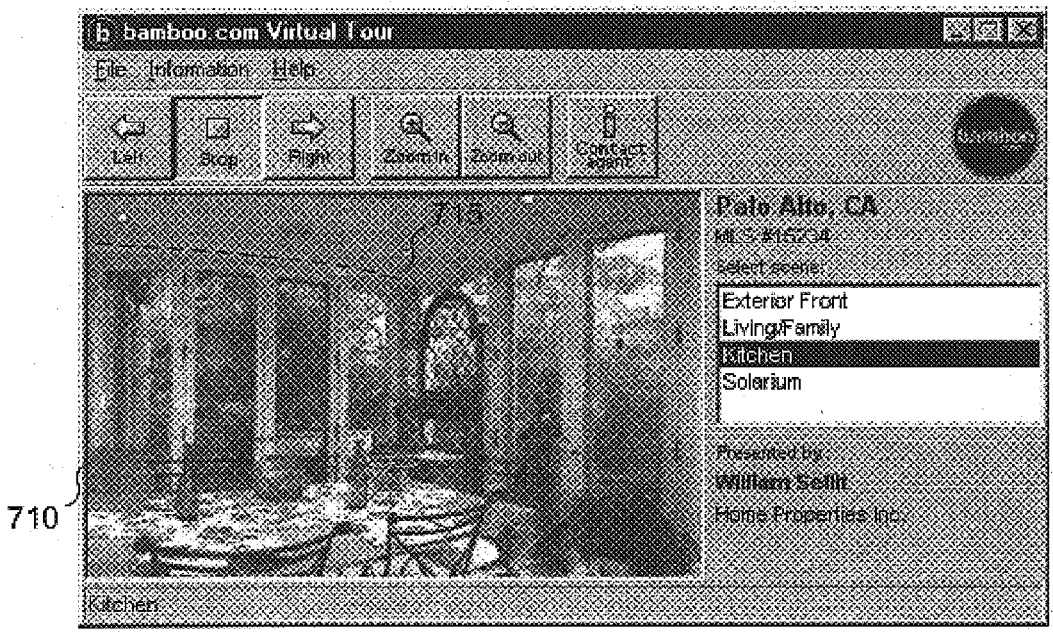
FIG. 7B illustrates the image of FIG. 7A with reduced dewarping as seen at a relatively high velocity according to one embodiment of the present invention.

FIG. 7A illustrates an image 700 with substantially accurate dewarping as seen at a relatively low velocity, e.g., zero velocity, according to one embodiment of the present invention. FIG. 7B illustrates the image of FIG. 7A with reduced dewarping as seen at a relatively high velocity according to one embodiment of the present invention. The differences become apparent with reference to the straight line 705 of FIG. 7A that appears as a somewhat curved line 715 in FIG. 7B.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system comprising:
   a storage device having stored therein a dewarping routine for transforming an image extracted from a scene into a perspective corrected image;
   a processor coupled to the storage device for executing the dewarping routine to generate the perspective corrected image, where:
   an appropriate dewarping transformation for correcting distortion in the image is determined as a function of rotational motion of the scene; and
   the perspective corrected image is created by applying the appropriate dewarping transformation to the image.

2. The computer system of claim 1, wherein the appropriate dewarping transformation is determined by generating a velocity-dependent transformation based upon the rotational motion of the scene.

3. The computer system of claim 1, wherein the appropriate dewarping transformation is determined by selecting a velocity-dependent transformation from a set of predetermined velocity-dependent transformation matrices based upon the rotational motion of the scene.

4. The computer system of claim 1, wherein the perspective corrected image is left substantially uncorrected when the rotational motion of the scene is within a first predetermined range.

5. The computer system of claim 1, wherein the perspective corrected image is substantially completely corrected when the rotational motion of the scene is within a second predetermined range.

6. A computer system comprising:
   a storage device having stored therein an immersive image viewer for allowing a user to navigate an immersive image; and
   a processor coupled to the storage device for executing the immersive image viewer to extract an intermediate image representation from a scene, determine a velocity-dependent transformation matrix, perform dewarping processing on the intermediate image representation to create an output image; and
   a display coupled to the processor for displaying the output image, where:
   the velocity-dependent transformation matrix is determined based upon rotational motion associated with the scene; and
   the dewarping processing comprises correcting distortion associated with the intermediate image representation by applying the velocity-dependent transformation matrix to the intermediate image representation.

7. The computer system of claim 6, wherein the scene comprises a 360 degree scene.

8. The computer system of claim 6, wherein the scene comprises a 360×360 degree scene.

9. The computer system of claim 6, wherein the intermediate image representation comprises a cylindrical environment map.

10. The computer system of claim 6, wherein the intermediate image representation comprises a spherical environment map.

* * * * *